Mar. 13, 1923.
A. E. MAYNARD
1,448,695
LENS HOLDER FOR EDGING MACHINES
Filed Aug. 18, 1919
3 sheets-sheet 1
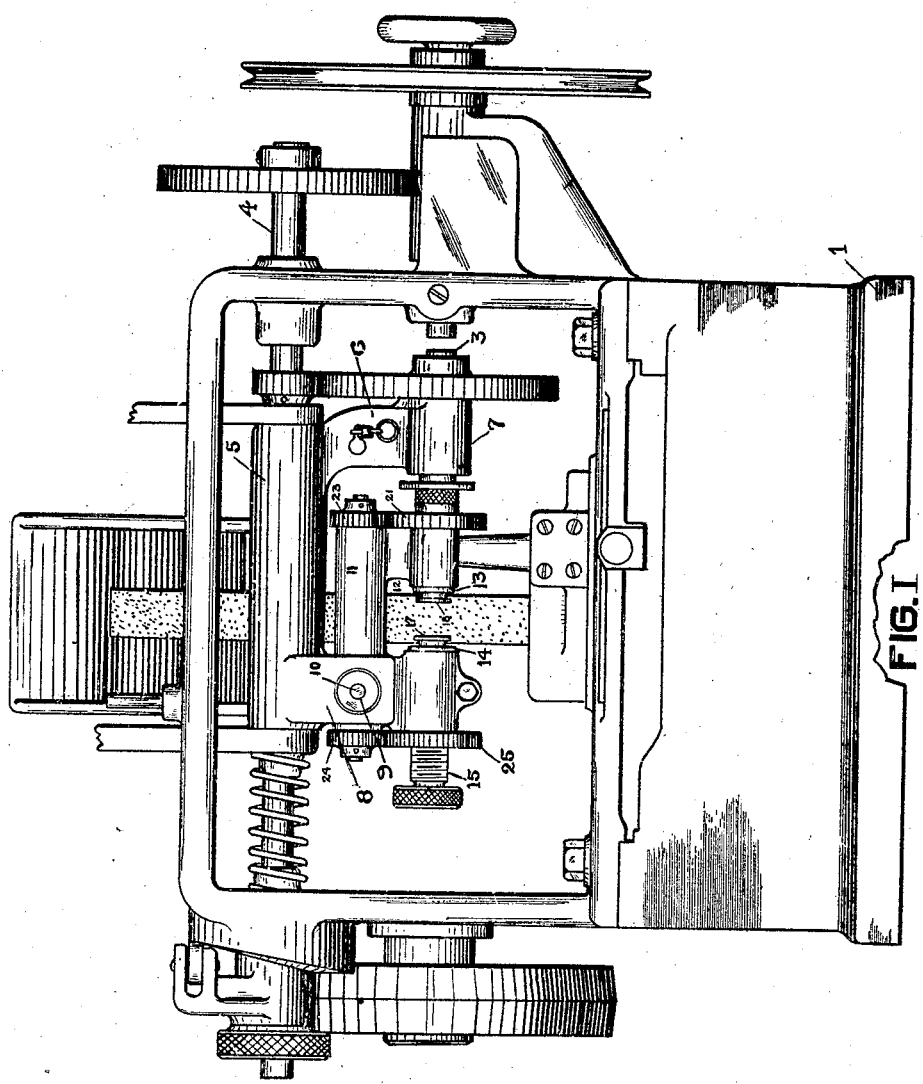
INVENTOR
A.E. MAYNARD
BY
H. H. Styll, A. K. Parsons
ATTORNEYS Mar. 13, 1923.
A. E. MAYNARD
1,448,695
LENS HOLDER FOR EDGING MACHINES
Filed Aug. 18, 1919
3 sheets-sheet 2
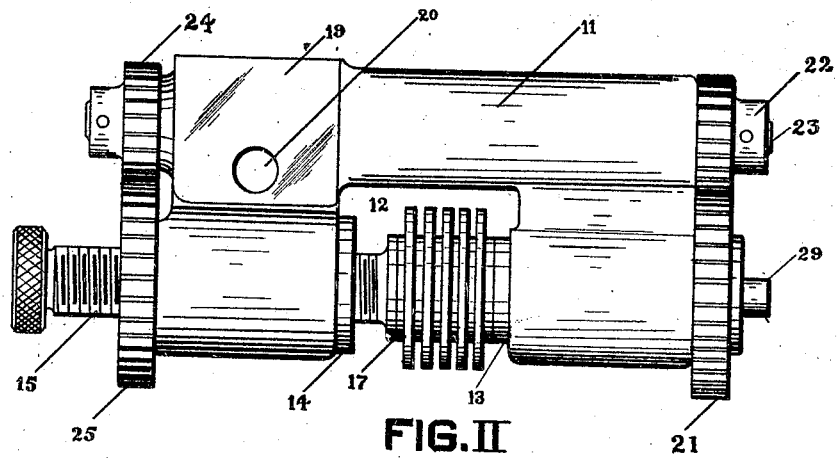
FIG. II
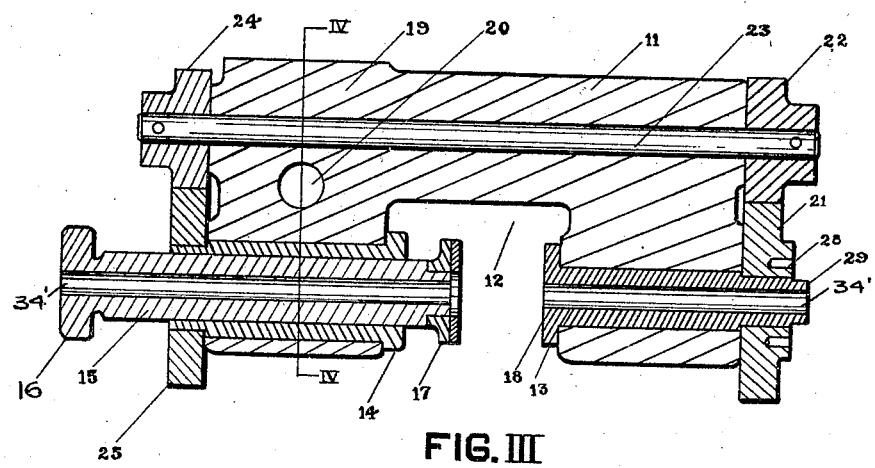
FIG. III
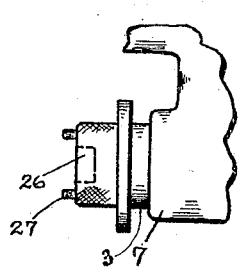
FIG. VII
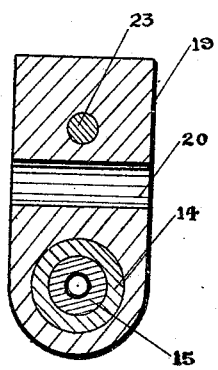
FIG. IV
INVENTOR
A. E. MAYNARD
BY
H. H. Styll + H. H. Parson
ATTORNEYS Mar. 13, 1923.
A. E. MAYNARD
1,448,695
LENS HOLDER FOR EDGING MACHINES
Filed Aug. 18, 1919
3 sheets-sheet 3
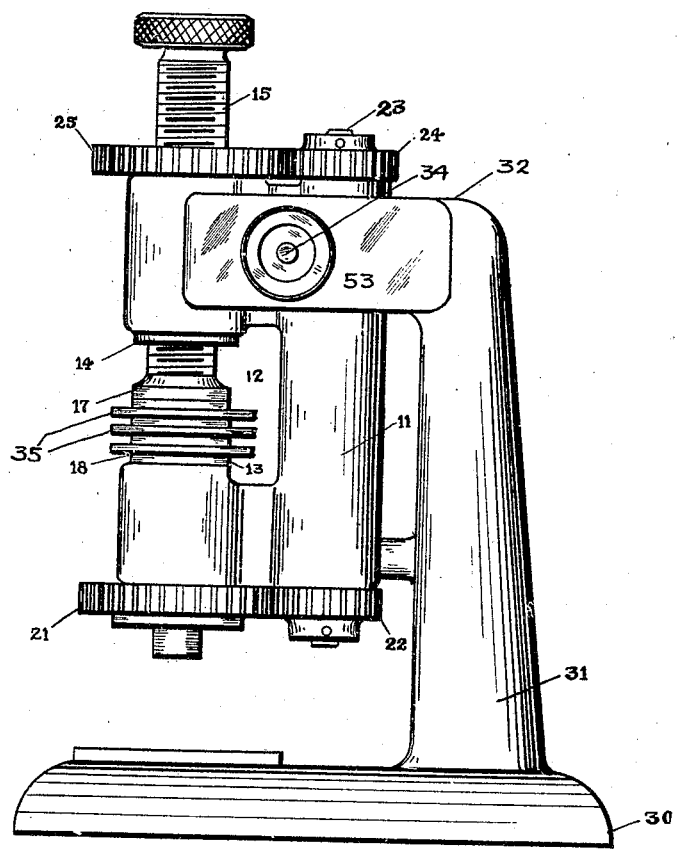
FIG. V
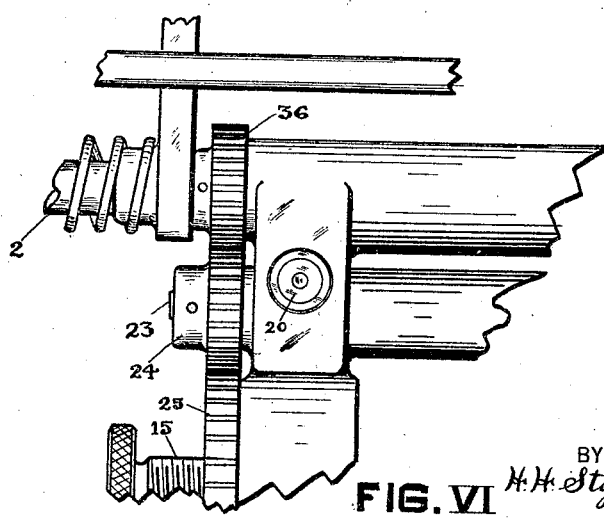
FIG. VI
INVENTOR
A. E. MAYNARD
BY H. H. Styll, H. H. Parson
ATTORNEYS Patented Mar. 13, 1923.

1,448,695

UNITED STATES PATENT OFFICE.

ALBERT E. MAYNARD, OF SOUTHBRIDGE, MASSACHUSETTS, ASSIGNOR TO AMERICAN OPTICAL COMPANY, OF SOUTHBRIDGE, MASSACHUSETTS, A VOLUNTARY ASSOCIATION OF MASSACHUSETTS.

LENS HOLDER FOR EDGING MACHINES.

Application filed August 18, 1919. Serial No. 318,381.

*To all whom it may concern:*

Be it known that I, ALBERT E. MAYNARD, a citizen of the United States, residing at Southbridge, in the county of Worcester and State of Massachusetts, have invented certain new and useful Improvements in Lens Holders for Edging Machines, of which the following is a specification.

This invention relates to new and useful improvements in lens edging machines, the main object of the present invention being the provision of a detachable lens holder for edging machines whereby the holder itself can be quickly and readily detached from the main portion of the machine and the lenses fixed therein and then replaced in position upon the body of the machine.

Another object of the present invention is the provision of a detachable lens holder for edging machines provided with means whereby the lenses are securely placed within the holder so that the center of each one of the lenses is in direct alinement, thus assuring an even surface upon the edge of each lens.

A further object of the present invention is the provision of a detachable lens holder for edging machines which can be quickly and readily detached from the main body of the machine and placed in a supporting bracket or holder specially adapted for supporting the lens holder in position while the lenses are being placed within the holder it being understood that the holder is placed in position within this bracket in such a manner that the lenses can be readily placed within the holder and the centers of the lenses arranged in direct alinement.

With the above and other objects in view, the invention consists in the novel features of construction and the combination and arrangement of parts hereinafter set forth, pointed out in the claims, and shown in the accompanying drawings, in which Figure I is a front elevation of a lens edging machine illustrating my improved detachable holder applied thereto.

Figure II is an enlarged side elevation of the holder itself, the same being shown detached from the main machine.

Figure III is a longitudinal sectional view of the same.

Figure IV is a transverse sectional view taken on the line 4—4 of Figure II.

Figure V is a detailed side elevation illustrating the supporting bracket for the detachable holder which supports the holder while the lenses are being placed in position.

Figure VI is a detailed side elevation.

Figure VII represents a fragmentary view of the lens holder drive connection.

Referring now more particularly to the drawings in which the various reference characters indicate the several parts throughout the views, the numeral 1 indicates the base member of the lens edging machine having supported thereon the driving mechanism which includes the main drive shaft 3 and an auxiliary shaft 4. Mounted upon the auxiliary shaft 4 is a carriage in the form of a sleeve 5 provided at one end with a bracket 6 which terminates in a second sleeve 7 adapted to receive the lens driving shaft 3, and projecting downwardly from the sleeve 5 at the end opposite the bracket 6 are the spaced ears 8 provided with a transverse opening 9 adapted to receive a removable pin 10. Disposed directly beneath this sleeve 5 and the parts just described is my improved lens holder generally indicated by the numeral 11, the central portion of which is provided with the lens receiving space 12. Extending through the body portion 11 of the holder upon opposite sides of the opening 12 are the sleeves 13 and 14 which extend from the opening 12 outwardly to the exterior of the body, and the sleeve 14 is adapted to receive a movable screw member adapted for longitudinal movement and generally indicated by the numeral 15. This screw member is provided upon its outer end with a knurled endpiece 16 and upon its inner end with a flattened face 17 adapted for engagement with the surfaces of the lenses which are to be disposed between the screw member 15 and the sleeve 13, the sleeve 13 being also provided with a flattened face as is indicated at 18 whereby the lenses may be securely clamped between the two flattened surfaces 17 and 18.

The holder 11 is provided with the substantially rectangular portion at one side thereof as is indicated by the numeral 19 which is preferably of a size and shape to fit securely between the ears 8 depending from the sleeve 5, and as this rectangular portion 19 is provided with a transverse opening 20, the pin 10 will readily extend therethrough, and as one end of the pin is threaded within one of the ears, it will securely retain the holder in its operative position. Keyed to the outer end of the shaft 13 is a pinion 21 adapted to mesh with a second pinion 22 which is mounted upon the outer end of a second shaft 23 which extends through the body 11 at its upper end throughout its entire length and is provided upon its outer end with a second pinion 24 adapted to mesh with a pinion 25 which is similar to the pinion 21. This pinion 25 is mounted upon the outer end of the sleeve 14 and it is thus that a double drive is applied to the lenses clamped between the faces 17 and 18 of the sleeve 13 and screw member 15. It will be understood that as the pinion 21 is the main driving pinion, power will be readily communicated from this pinion to the pinion 25 through the pinions 22 and 24 on the shaft 23 so that an even driving power will be applied to each side of the lens holder.

In positioning the lens holder within the main machine, the rectangular portion 19 is first inserted within the ears 8 and, as the inner end of the main drive shaft 3 is provided with a central recess 26 and spaced lugs 27 disposed upon opposite sides of this recess, which are adapted to co-act with the openings 28 and lug 29 upon the shaft 13 and pinion 21, it will be readily apparent that these two parts will be quickly fitted together so that a movement may be communicated from the main drive shaft to the pinion 21.

In order to facilitate the accurate positioning of the lenses within my improved holder I provide a support or bracket for the holder which includes a base member 30, a standard 31, and an arm 32, the outer end of which is bifurcated to form the spaced ears 53 which are adapted to be fitted upon opposite sides of the rectangular portion 19, and a pin 34 is extended through these ears and the rectangular portion in order to retain the lens holder in its proper position while the lenses are being placed therein. It will be noted in Figure III that the screw member 15 and the sleeve 13 are provided with central alined openings 34' which extend entirely through the holder and are adapted to be used when placing the lenses in position within the holder. As illustrated in Figure V, the holder is in position to receive the lenses which are generally indicated by the numeral 35 and, as the holder is in such a position that a person may readily look straight through the alined openings of the sleeve 13 and screw member 15, it can be readily ascertained as to when the lenses are in their correct alined positions by noting the center point of the lens which will be marked before the lenses are placed in their holder. In order to facilitate this positioning a small electric light or reflecting mirror may be placed upon the base member 30 so as to be directly beneath this opening. After the lenses have been placed in their proper positions, the screw member 15 is tightened so as to securely hold the lenses in position. The holder is then removed from between the ears 53 and transferred to the main machine.

In Figure VI I have illustrated means whereby the lens holder may receive additional driving means and in this form of the invention an extra pinion 36 is mounted upon the shaft 2 at a point adjacent the spaced ears 8 and is adapted to mesh with the pinion 24 of the shaft 23. Thus, the lenses secured within the holder will not only be driven through the main drive shaft 3 but through the auxiliary shaft 2 and the pinion 36. It is thought that this driving means will provide a more direct drive, thus assuring perfect and even movement of the lenses while being rotated against the edging stone.

From the foregoing description taken in connection with the accompanying drawings it will be readily apparent that I have provided a simple and durable lens holder which not only can be quickly and readily removed from the main body of the machine for the placing of the lenses therein but I have provided a holder wherein it will be assured that the lenses when placed within the holder are in such a position that their centers are in direct alinement, and at the same time have provided means whereby the direct driving power is supplied to both sides of the lens holder to insure of an even movement of the lenses against the edging wheel.

While I have illustrated my improved holder as applied to a certain type of machine, it will be readily apparent that it can be used equally as well on various types of machines.

I claim:

1. A device of the character described comprising a body portion having a part for selective engagement by a centering stand or an edging machine frame, and having a pair of spaced rotatable lens clamp members, means for moving said clamp members together to secure a lens or lenses therebetween, said clamp members and adjacent parts having a central sight passage formed therethrough, substantially as and for the purpose described.

2. A lens edging machine, including a stone and a carriage for cooperation with the stone, a support on the carriage and a lens centering holder detachably secured to the support, said holder including a pair of lens clamping members, rotatable supports for said clamp members, means for rotating the supports in unison to properly drive the lenses, said rotatable lens clamp members having alined center passages formed therethrough for use in centering the lenses prior to the introduction of the holder in the machine, substantially as and for the purpose described.

3. A lens holder including a body member having a central recess on one side thereof, lens clamping members mounted for rotation within the body and having the inner ends disposed within the recess for clamping lenses therein, said clamping members being provided with longitudinally alined openings.

4. A lens holder including a body member having a recess on one side thereof, lens clamping members mounted for rotation within the body and having the inner ends disposed within the recess for clamping lenses therein, said clamping members being provided with longitudinally alined openings, means for driving said lens clamping members simultaneously, and means for detachably connecting the body of the holder with a lens edging machine or the like.

5. A lens edging machine including a carriage member having a driven stud shaft and a lens holder clamp and a lens holding member comprising a body portion having a part fitted for operative engagement by the clamp on the carriage, and having a pair of opposed lens clamp members spaced to receive a lens therebetween, and means journaled in the body portion and operatively connecting the said clamp members for synchronous rotation, said lens clamp members having a continuous central passage formed therethrough whereby the lenses may be properly positioned between the lens clamp members and the device as an entirety subsequently applied in operative position to the carriage to facilitate precision edging of the lenses.

In testimony whereof I have affixed my signature, in presence of two witnesses.

ALBERT E. MAYNARD.

Witnesses:
H. E. COLEMAN,
ESTHER M. SAFLER.